United States Patent
Singh et al.

(10) Patent No.: US 11,851,506 B2
(45) Date of Patent: Dec. 26, 2023

(54) PROCESS FOR PREPARATION OF A CATALYST FOR POLYMERIZATION OF OLEFINS

(71) Applicant: Indian Oil Corporation Limited, Maharashtra (IN)

(72) Inventors: Gurmeet Singh, Haryana (IN); Rashmi Rani, Haryana (IN); Sukhdeep Kaur, Haryana (IN); Yajnaseni Biswas, Haryana (IN); Anju Chopra, Haryana (IN); Gurpreet Singh Kapur, Haryana (IN); Sankara Sri Venkata Ramakumar, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 17/953,459

(22) Filed: Sep. 27, 2022

(65) Prior Publication Data

US 2023/0159676 A1 May 25, 2023

(30) Foreign Application Priority Data

Sep. 27, 2021 (IN) .............................. 202121043762

(51) Int. Cl.
*C08F 110/02* (2006.01)
*C08F 4/654* (2006.01)

(52) U.S. Cl.
CPC .................................. *C08F 110/02* (2013.01)

(58) Field of Classification Search
USPC .......................................... 502/107; 526/908
See application file for complete search history.

(56) References Cited

U.S. PATENT DOCUMENTS

| | | | |
|---|---|---|---|
| 5,108,972 A * | 4/1992 | Wang | ...................... C08F 10/00 502/111 |
| 6,881,696 B2 | 4/2005 | Yang et al. | |
| 7,153,803 B2 | 12/2006 | Zhu et al. | |
| 9,562,119 B2 | 2/2017 | Chang et al. | |
| 9,587,041 B2 | 3/2017 | Kaur et al. | |
| 9,644,050 B2 * | 5/2017 | Kaur | ...................... C08F 110/06 |
| 2016/0347882 A1 * | 12/2016 | Singh | ...................... C08F 110/06 |

FOREIGN PATENT DOCUMENTS

| | | |
|---|---|---|
| CN | 104974283 A | 10/2015 |
| RU | 2674440 C1 | 12/2018 |

OTHER PUBLICATIONS

S. Sivaram, et al., "Polymerization of Olefins with Magnesium Chloride-Supported Catalysts", Semantic Scholar, 1987, 3 pgs.

* cited by examiner

*Primary Examiner* — Fred M Teskin
(74) *Attorney, Agent, or Firm* — Blank Rome LLP

(57) ABSTRACT

The present invention relates to a process for preparation of a catalyst for polymerization of olefins. The catalyst has a particle size of between 5 to 30 microns with activity ranging from 3-4 Kg (co)polymer per g of catalyst and excellent hydrogen response. The method for preparation of the catalyst comprises the steps of: a) contacting a liquid magnesium complex, an electron donor, and a titanium halide compound to form a solution; b) obtaining the solid uniform catalyst particles by precipitation; and c) washing the catalyst particles to obtain solid uniform catalyst., for producing (co)polymer of ethylene with other olefins have fines less than 10 wt. %.

9 Claims, No Drawings

PROCESS FOR PREPARATION OF A CATALYST FOR POLYMERIZATION OF OLEFINS

RELATED APPLICATION

This application claims the benefit of Indian Application No. 202121043762, filed on Sep. 27, 2021. The entire disclosure of this application is hereby incorporated by reference.

FIELD OF THE INVENTION

The present invention relates to a catalyst and a process for preparing the same. More particularly, the present invention provides a process for preparing a catalyst for polymerization of olefins and a process for the polymerization of olefins.

BACKGROUND OF THE INVENTION

Ziegler-Natta (ZN) catalyst systems are well known for their capability to polymerize olefins. They in general consist of a support which mostly is magnesium based, onto which a titanium component is added along with an organic compound known as internal electron donor. This catalyst when combined with a co-catalyst and/or an external donor comprise the complete ZN catalyst system.

ZN catalyst systems for ethylene polymerization especially for manufacturing high-density polyethylene (HDPE) at high polymerization activity are being developed and commercialized. These catalysts produce polymers having high bulk density and can be used for slurry and gas phase polymerization. In general, a highly desirable polyethylene (PE) catalyst should have narrow particle size distribution, high activity, good hydrogen response, better co-monomer distribution, high bulk density and low fines.

U.S. Pat. No. 6,881,696 provides a catalyst for polymerization and copolymerization of ethylene using a magnesium solution prepared by dissolving $MgCl_2$ in decane and 2-ethyl hexanol at high temperatures. This solution is typically reacted with ester having a hydroxyl group, and alkoxy boron compound followed by producing a solid titanium catalyst through recrystallization by reacting the magnesium composition solution with a mixture of a titanium compound in presence of haloalkane compound. The catalyst as claimed provided good activity and hydrogen response.

U.S. Pat. No. 7,153,803 discloses a catalyst system and method of making the catalyst system/support for the polymerization of polyethylene. The process is based on usage of a catalyst support made from a magnesium compound, an alkyl silicate, and a monoester. Both the alkyl silicate and the monoester provide a uniform and relatively large particle size, with minimal fines.

U.S. Pat. No. 9,562,119 describes the preparation of a catalyst by reacting a titanium compound, a magnesium compound, an alcohol, an aluminum alkoxide, a siloxane mixture and a maleate derivative. During this catalyst preparation, maleate derivate is added as a precipitating agent i.e., it aids in the precipitation of catalyst particles from a solution.

RU patent 2674440 discloses a method of producing a catalyst for the polymerization of olefins by contacting magnesium metal with an organic halide RX to form a soluble product (I), followed by addition to the product (I) a silicon compound containing a alkoxy group to form a solid product (II) and subsequent processing of the product (II) with titanium tetrachloride and an electron donor compound. The molar ratio of $TiCl_4/Mg$ in step (c) is from 10 to 100, preferably The molar ratio of electron-donating compound to magnesium is 0.05-0.75, preferably 0.1-0.4. The catalyst provides a high bulk density of the obtained polypropylene powder and a narrow particle size distribution (SPAN=(d 90 −d 10)/d50=0.2-0.6), has a fairly high activity and stereospecificity. The reaction temperature in step (c) is 50-150° C., preferably 60-120° C. At low or high temperatures, the activity of the catalyst becomes low.

CN patent 104974283B discloses a preparation method of the catalytic component for ethylene polymerization, which involves step (1) preparation of solids A: Magnesium compound is dissolved in organic epoxy compound and organic phosphorus compound to form a homogeneous solution, then the halogenide with titanium is mixed with it. The titanium halogenide is present in 0.5-120 moles per mole of magnesium compound; step (2): preparation of solution B: at least one inorganic titanium compound and at least one organic titanic compound are dissolved in electron donor compound, and B solution is formed. The organic titanium compound is present in 0.1-10 mole, and electron donor compound is present in 1-50 mole, per mole of magnesium compound; and step (3): In this step, activator is added to the solution of step (2) to obtain catalyst component. In the catalytic component obtained by the present invention, titanium: 1-10%, aluminum: 0.1-2%, electron donor: 1-40% is present.

S. Sivaram et al. discloses a method for titanium-based high efficiency olefin polymerization. It comprises comilling anhydrous $MgCl_2$ with an electron donor (typically EB) followed by treatment with $TiCl_4$ in the liquid phase. In some cases, prior to reaction with $TiCl_4$, the milled $MgCl_2.EB$ complex is also treated with a second electron donor and an organoaluminum compound.

U.S. Pat. No. 9,587,041 B2 discloses a process for preparation of a solid organomagnesium precursor having formula $\{Mg(OR')X\}.a\{MgX2\}.b\{Mg(OR')2\}.c\{R'OH\}$, wherein R' is selected from a hydrocarbon group, X is selected from a halide group. The present invention also provides a process for preparing a catalyst system using the organomagnesium precursor and its use thereof for polymerization of olefins.

There are various processes and descriptions for making polyethylene catalyst using magnesium, titanium and internal electron donor resulting in formation of high activity catalyst. But there are limited catalyst processes available where the resultant catalysts exhibit all the required properties.

The main problem being addressed in the present invention is the hydrogen response of the catalyst. In the first reactor of the slurry phase process very high concentration of hydrogen is required to enable production of targeted high melt flow index (MFI) or low molecular weight polyethylenes. When commercial catalyst is exposed to very high concentrations of hydrogen in the reactor, the catalyst shows highly reduced activity as monomer availability gets reduced, which also negatively impacts throughput. Moreover, to produce bimodal or broad molecular weight polyethylenes, commercial catalysts with lower hydrogen response yield pose restrictions on the products which can be produced. The catalyst in the present invention overcomes this problem. The second problem addressed in the present invention is achieving the desired particle size of the catalyst and high activity without compromising on the fines generated during polymerization.

SUMMARY OF THE INVENTION

The present invention describes a catalyst comprising a liquid magnesium complex, an electron donor compound, and a titanium halide compound, wherein the particle size of the catalyst ranges between 5 to 30 microns with activity ranging from 3-4 Kg (co)polymer per g of catalyst and excellent hydrogen response. The process of preparing the catalyst comprises: a) contacting a liquid magnesium complex, an electron donor, and a titanium halide compound to form a solution; b) obtaining the catalyst particles by precipitation; and c) washing the catalyst particles to obtain a solid uniform catalyst, for producing (co)polymers of ethylene with other olefins have fines ranging from 3-10 wt. %.

Technical Advantages of the Invention

The advantages of the catalyst over the cited prior art are as follows:
(a) polyethylene catalyst having particles size of between 5-30 microns;
(b) catalyst comprises a SPAN of less than 2.0, better hydrogen response, improved monomer insertion, high activity and improved morphology;
(c) catalyst produces (co)polymers of ethylene with other olefins have fines ranging from 3-10 wt. %;
(d) catalyst has ability to produce bimodal polymer; and
(e) the process of preparation of the catalyst does not require higher temperature or longer time, also harsh chemicals based on transition metals are used in relatively lesser amount.

Objectives of the Invention

The primary objective of the present invention is to provide process for preparation of a catalyst for polymerization of olefins, the process comprising:
(a) contacting a liquid magnesium complex, an electron donor compound and a titanium halide compound to form a solution;
(b) precipitating the solution to obtain catalyst particles by providing a temperature ramp and holding the solution at specific temperatures; and
(c) washing the catalyst particles with an inert solvent to obtain a solid uniform catalyst.

It is yet another objective of the present invention to provide a process for polymerization of olefins comprising contacting the catalyst, with an olefin and a co-catalyst in presence of an inert hydrocarbon medium.

Abbreviations

ZN: Ziegler-Natta
HDPE: high-density polyethylene
PE: polyethylene
MFI: melt flow index
FRR: Flow Rate Ratio
LLDPE: linear low-density polyethylene
VLDPE: very low-density polyethylene
ULDPE: ultra low-density polyethylene

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps of the process, features of the system, referred to or indicated in this specification, individually or collectively and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have their meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally equivalent products and processes are clearly within the scope of the disclosure, as described herein.

The present invention discloses a catalyst for polymerization of olefins, the catalyst comprising:
(a) a liquid magnesium complex,
wherein the liquid magnesium complex is {Mg(OR')X}.a{MgX2}.b {Mg(OR')2}.c{R'OH}, wherein R'OH is 2-ethyl hexanol and X is chloride;
(b) an electron donor compound; and
(c) a titanium halide compound,
wherein the titanium halide compound is present in an amount ranging from 1-50 moles, per mole of magnesium; and wherein the electron donor compound is present in an amount ranging from 0.05-10 moles, per mole of magnesium.

The present invention discloses a process of preparing a catalyst having particles size of between 5 microns to 30 microns with activity ranging from 3-4 Kg (co)polymer per g of catalyst and excellent hydrogen response.

The process for preparation of the catalyst comprises: a) contacting a liquid magnesium complex, an electron donor, a titanium halide compound to form a solution wherein the titanium halide compound and the liquid magnesium complex is present in from about 1 to about 10 moles, per mole of magnesium; b) precipitating the solution to obtain the catalyst particles by providing a temperature ramp and holding the solution at specific temperature; and c) washing the catalyst particles with an inert solvent to obtain solid uniform catalyst, for producing (co)polymers of ethylene with other olefins have fines ranging from 3-10 wt. %.

The step (b) of the process comprises precipitating the solution to obtain catalyst particles by providing a temperature ramp and holding the solution at specific temperature:

(i) providing a first temperature ramp of 0.1-10° C./minute at a temperature ranging from 5-25° C.;

(ii) holding for at least 15 minutes;

(iii) providing a second temperature ramp of 0.1-10° C./minute at a temperature ranging from 25-45° C.;

(iv) holding for at least 30 minutes;

(v) providing a third temperature ramp of 0.1-10° C./minute at a temperature ranging from 45-110° C.; and (vi) holding for at least 15 minutes at a temperature of 75° C.

In another embodiment, the particle size of the catalyst is very crucial, and it is highly desirable to have optimum particle size to obtain characteristic properties in the resultant polymer in terms of molecular weight, bulk density, MFI, improved flowability, etc. This is one of the essential features of a catalyst to work as "drop-in" catalyst in any commercial polymerization plant.

It is an embodiment of the present invention that the catalyst particle size (defined as diameter) is from 5 to 30 microns (D50). In another embodiment, the catalyst particle size is achieved through the method/process of preparing the catalyst specifically the precipitation process i.e., step (b), which involves precipitating the solution to obtain catalyst particles by providing a temperature ramp and holding the solution at specific temperature.

In another embodiment, it was found by the inventors that the choice of the nature of magnesium-based precursor plays crucial role on the activity (defined as polymer weight in kg per gram of the catalyst per hour) of the prepared catalyst. In an embodiment, the activity of the catalyst is ranging from 3-4 Kg (co)polymer per g of catalyst. The liquid magnesium complex is $\{Mg(OR')X\}.a\{MgX2\}.b\{Mg(OR')2\}.c\{R'OH\}$, wherein R'OH is 2-ethyl hexanol and X is chloride. This magnesium-based precursor used is prepared through the process as described in WO patent application 2014045259. According to the present invention, the liquid magnesium complex contains magnesium and is prepared by contacting magnesium source with benzyl halide and 2-ethyl hexanol in presence of toluene in a single step.

In yet another embodiment, the electron donors suitable for preparing the catalyst are selected from the group consisting of alcohols, carboxylic acids, aldehydes, amines, ethers, and esters. In another embodiment, the electron donors particularly suitable are selected from the group consisting of methanol, ethanol, isopropanol, isobutanol, tert-butanol, 2-ethyl 1-hexanol, methyl formate, butyl formate, ethyl acetate, vinyl acetate, propyl acetate, octyl acetate, tetraorthosilicate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methylbenzoate, ethyl p-t-butylbenzoate, ethyl naphthoate, methyl toluate, ethyl toluate, amyl toluate, ethyl ethylbenzoate, methyl anisate, ethyl anisate, ethyl ethoxybenzoate and mixture thereof.

In another embodiment, specific examples of the titanium halide compound include, but are not limited to titanium tetrahalides such as titanium tetrachloride, titanium tetrabromide, titanium tetraiodide; alkoxytitanium trihalide such as methoxytitanium trichloride, ethoxytitanium trichloride, butoxytitanium trichloride, phenoxytitanium trichloride; dialkoxy titanium dihalides such as diethoxy titanium dichloride; trialkoxytitanium monohalide such as triethoxy titanium chloride; and mixtures thereof, with titanium tetrachloride being preferred. These titanium compounds may be used alone or in the form of a mixture thereof.

In an embodiment of the present invention, the electron donor is added in an amount ranging from 0.05 to 10 moles, preferably 0.1 to 5 moles, per mole of magnesium and electron donor is added to liquid magnesium complex at a temperature ranging from 0 to 40° C. for 0.5 to 5 hours, preferably, at temperature from 0 to 20° C. for 0.5 to 2 hours.

In an embodiment of the present invention, the titanium compound is added in an amount ranging from usually at least 1 to 50 moles, preferably 1 to 20 moles, and more preferably 1 mole to 10 moles, per mole of magnesium.

In an embodiment of the present invention, contacting a liquid magnesium complex, an electron donor and a titanium halide compound at a temperature ranging from 0 to 90° C. for 1 to 10 hours, preferably from 0 to 50° C. for 1 to 6 hours. There are several examples/ways for the method of contacting a liquid magnesium complex, an electron donor, and a titanium halide compound. In an embodiment of the present invention, the desirable characteristic of the resultant catalyst is achieved preferably by, addition of liquid magnesium complex to titanium compound. In another embodiment, this addition is either done one shot or drop wise.

In an embodiment of the present invention, contacting a liquid magnesium complex, an electron donor and a titanium halide compound is done such that it forms a solution. The procedure of contacting the liquid magnesium complex, an electron donor and a titanium halide compound may be repeated one, two, three or more times, as desired. In a preferred embodiment, the contacting procedure is carried out once.

Further, in yet another embodiment, any person skilled in Ziegler-Natta catalyst knows that it is very crucial and challenging to obtain desirable catalyst particle size. This has many dimensions where one uses the concept of controlling the particle size of the magnesium-based compound known as precursor or support while other concept uses chemical implementation of precursor onto inert support like silica. Another concept is precipitation which is generally based on forming a solution of precursor and allowing the catalyst component to precipitate out after titanation, wherein titanation refers to formation of a titanate, i.e., the action or process of introducing titanium into a compound. This is the most challenging process as there are lots of controlling factors besides chemistry of the precursor.

In yet another embodiment, the purpose of the titanium halide compound is to help in the formation of amorphous $MgCl_2$ by acting as halogenating agent as well as being dispersed and supported on the catalyst surface. Moreover, it also helps in the removal of alcohol from the solution, resulting in the precipitation of the solid component, having specific desired surface properties and particle shape. More importantly, the particles are uniform in shape. The inventors have found that precipitation of uniform solid catalyst particles from the solution occurs at particular range of temperatures.

In an embodiment of the present invention, the precipitation of solid uniform catalyst particles is done by providing a temperature ramp along with holding the solution at specific temperatures. A first temperature ramp is provided for 0.1° C./min to 10° C./min at a temperature from 5 to 25° C., holding for at least 15 min, a second temperature ramp is provided for 0.1° C./min to 10° C./min at a temperature from 25 to 45° C., holding for at least 30 min and a third temperature ramp is provided for 0.1° C./min to 10° C./min at a temperature from 45 to 110° C., holding for at least 15 min at 75° C.

Further, in another embodiment SPAN of the catalyst is defined as SPAN=(D90−D10)/D50. In another embodiment, the precipitation process provides catalyst particles of narrow particle size distribution with SPAN of 0.8-2.0.

Further, in another embodiment the resulting solid catalyst comprising of magnesium, titanium, halogen, alcohol, and the electron donor can be separated from the reaction mixture either by filtration or decantation and finally washed with inert solvent to remove the unreacted titanium component and other side products. Usually, the solid catalyst is washed one or more times with inert solvent. In an embodiment, the solid catalyst is washed with toluene once. In another embodiment, the solid catalyst is further washed one or more time with inert solvent which is typically a hydrocarbon including, not limiting to aliphatic hydrocarbon like isopentane, isooctane, hexane, heptane, pentane or isohexane.

In yet another embodiment, the catalyst synthesis process as described in the present invention is a simple process where harsh chemicals based on transition metals are used in relatively lesser amount. Another advantage of the process is that it doesn't requires higher temperatures and longer time periods for catalyst synthesis.

In another embodiment of the present invention, the catalyst has excellent granular morphology. It is another characteristic of the catalyst prepared through this process that produces polyethylene (co)polymer controlled molecular weight and melt flow rates.

In another embodiment of the present invention, the invention provides a catalyst for (co)polymerization of ethylene. In another embodiment, the invented catalyst provides bimodal (co)polymers of ethylene with other olefins, which have fines less than 10%. Despite having very high activity during (co)polymerization of ethylene, the fines generated in polymer range from 3-10 wt. %. This is advantageous as this will provide high throughput during polymerization operation while minimizing fines related issues like reduced hotspot, increased flowability, and especially ease of operation in downstream units.

In yet another embodiment, it is highly desirable to have a catalyst with excellent hydrogen response in order to prevent/overcome the prevalent way of adjusting the hydrogen concentration in a bimodal polymerization process by venting the hydrogen from a reactor. This approach not only wastes reactants such as monomers but also results in increased operating costs. The present invention provides a process for producing a catalyst with excellent hydrogen response wherein when used in bimodal polymerization process, the catalyst substantially reduces the wasteful venting of hydrogen. In typical slurry phase, two or three reactor configuration, hydrogen concentrations are kept very high in the first reactor to enable production of low molecular weight or very high MFI polyethylene. Due to high partial pressure of hydrogen, availability of ethylene gets limited, which not only reduces the catalyst activity but throughput as well. This polymer is then transferred to subsequent reactor with flashing of hydrogen and ethylene. Higher the hydrogen amount in first reactor, higher is the challenges with its efficient removal. Any carryover of hydrogen along with polymer pose further difficulties in managing subsequent reactor(s) as to produce low MFI or very high molecular weight polyethylene, therefore, low concentrations of hydrogen is essentially required. Moreover, for specialty grades including PE100, broad molecular weight or bimodal distribution is must. Catalyst having high hydrogen response alleviates the above-described challenges as now same MFIs Is are achievable at low hydrogen concentrations and thus problems associated with high hydrogen requirement in first reactor gets mitigated. These catalysts also enable efficient production of broad molecular weight polyethylene.

In another embodiment, the catalyst efficacy defined as kg polymer per g of catalyst per hour of polymerization decreases with increasing amount of hydrogen.

In an embodiment, the polyethylene produced by the said described catalyst has melt flow indexes (Ml), measured according to ASTM standard D 1238 from 0.001 to 3,000 dg/min, preferably from 0.005 to 1,000 dg/min, more preferably from 0.02 to 100 dg/min.

In yet another embodiment, the Flow Rate Ratio (FRR) or 21.6/5 is determined by ASTM standard D1238 where 21.6 is a melt index of the polymer measured at 190° C. under a load of 21.6 kg and 5.0 is a melt index of the polymer measured at 190° C. under a load of 5.0 kg. Higher FRR indicates a broader molecular weight distribution. In another embodiment, the polyethylene produced by the said described catalyst shows higher FRR.

Furthermore, A process for polymerization of ethylene/olefin comprises contacting the catalyst with ethylene typically in the presence of hydrogen, under polymerization conditions. The polymerization conditions include catalyst, organoaluminium compounds and/or external electron donors. The co-catalyst may include hydrides, organoaluminium, lithium, zinc, tin, cadmium, beryllium, magnesium, and combinations thereof In an embodiment, the preferred co-catalyst is organoaluminium compounds.

In an embodiment, the organoaluminium compounds include, not limiting, alkylaluminums such as trialkylaluminum, such as preferably triethylaluminum, triisopropylaluminum, triisobutylaluminum, tri-n-butylaluminum, tri-n-hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide. The mole ratio of aluminium to titanium is from about 1:1 to about 150:1 or from about 1:1 to about 100:1.

In another embodiment, the ethylene is polymerized under mild conditions in an inert hydrocarbon medium. In another embodiment, inert hydrocarbon medium includes aliphatic hydrocarbons such as propane, butane, isobutane, pentane, hexane, heptane, octane, decane, dodecane and kerosene; alicyclic hydrocarbons such as cyclopentane, cyclohexane and methylcyclopentane; aromatic hydrocarbons such as benzene, toluene, and xylene, liquid olefins, and mixtures thereof.

In yet another embodiment, the polymerization process can be carried out such as by slurry polymerization using an inert hydrocarbon solvent as a diluent, or bulk polymerization using the liquid monomer as a reaction medium and in gas-phase operating in one or more fluidized or mechanically agitated bed reactors. In another embodiment, the copolymerization is carried out using at least two polymerization zones. The process for polymerization of olefins comprises contacting the catalyst as claimed in claim 1, with an olefin and a co-catalyst in presence of an inert hydrocarbon medium at a temperature ranging from 10 to 200° C.

In particular, said catalyst can be used to produce, the following products such as high-density polyethylene (HDPE), having a density higher than 0.940 g/cm$^3$, which includes ethylene homopolymer and copolymer of ethylene and a-olefins having 3 to 12 carbon atoms; linear low-density polyethylene (LLDPE), having a density lower than 0.940 g/cm$^3$, and very low density and ultra-low density polyethylene (VLDPE and ULDPE), having a density lower than 0.920 g/cm$^3$, and as low as 0.880 g/cm$^3$, consisting of the copolymer of ethylene and one or more a-olefins having 3 to 12 carbon atoms, wherein the molar content of the unit derived from ethylene is higher than 80%; elastomeric copolymer of ethylene and propylene, and elastomeric terpolymers of ethylene, propylene and butene-1 as well as diolefins at a small ratio, wherein the weight content of the unit derived from ethylene is between 30% and 70%.

In yet another embodiment, when the polymerization is carried out in gas phase, operation pressure is usually in the range of from 5 to 100 bar preferably from 10 to 50 bar. The operation pressure in bulk polymerization is usually in the range of from 10 to 150 bar, preferably from 15 to 50 bar. The operation pressure in slurry polymerization is usually in the range of from 1 to 10 bar, preferably from 2 to 7 bar. Hydrogen can be used to control the molecular weight of polymers.

In yet another embodiment, the catalyst described in the present invention provides polyethylene with excellent particle size distribution, excellent bulk density and broader molecular weight distribution. In the present invention, the described catalyst can be directly added to the reactor for polymerization or can be pre polymerized i.e., catalyst is subjected to a polymerization at lower conversion extent before being added to polymerization reactor. Pre polymerization can be performed with ethylene where the conversion is controlled in the range from 0.2 to 500 gram polymer per gram catalyst.

The present invention also provides a catalyst system. This catalysts system when polymerizes ethylene provides polyethylene having bulk densities (BD) of at least 0.40 cc/g.

EXAMPLES

Having described the basic aspects of the present invention, the following non-limiting examples illustrate specific embodiments thereof. Those skilled in the art will appreciate that many modifications may be made in the invention without changing the essence of invention.

Preparation of Liquid Magnesium Complex

In 500 ml glass reactor maintained at 25° C., calculated amount of magnesium (powder or turnings) was weighed and added into the reactor followed by addition of calculated amount of benzyl chloride followed by addition of 2-ethyl-1-hexanol in toluene. This mixture was stirred and gradually heated to 90° C. ±3. After the activation of the reaction, the mixture was allowed to be maintained at same temperature for 6 hours. The resulting homogenous solution was slightly viscose in nature and showed no separations on standing. The magnesium content was measured to be 1.8 wt.%.

Preparation of the Inventive Catalyst (A)

To 30 ml of TiCl$_4$ solution maintained at 10° C., was added 100 ml of the liquid magnesium complex along with ethyl benzoate as electron donor (4 ml) (maintained at 10° C. for 1 hour) over a period of 15 minutes resulting in clear solution. This addition was carried out under stirring at a constant rate. After the system had attained the desired temperature, the resultant solution was maintained at the same temperature for 15 minutes. The reaction temperature was increased to 40° C., 70° C. such that the temperature was held at each point for 15 minutes, 30 minutes and minutes. The final temperature achieved was 100° C. and maintained for 1 hour. After settling and decantation, the suspended solid was again treated with 130 ml toluene as inert solvent and the mixture was maintained at 100° C. under stirring for 1 minute. Again, after settling and decantation, the solid catalyst was washed sufficiently with hexane at 70° C., respectively and further dried under hot nitrogen till freely flowing. The resulting catalyst's particle size and SPAN are 9.5 micron and 0.9, respectively and the resultant catalyst is regular in shape.

Preparation of the Inventive Catalyst (B)

Example A is repeated using tetraorthosilicate as inert solvent. The resulting catalyst's particle size and SPAN are 10.0 micron and 0.9, respectively and the resultant catalyst is regular in shape.

Preparation of the Inventive Catalyst (C)

Example A is repeated but the reaction temperature was increased to 15° C., 50° C., 80° C. such that the temperature was held at each point for 15 minutes, 30 minutes and 15 minutes. The resulting catalyst's particle size and SPAN are 8.6 micron and 0.8, respectively and the resultant catalyst is regular in shape.

Preparation of the inventive catalyst (D)

Example A is repeated keeping the increase in reaction temperature to 20° C., 40° C., 70° C. such that the temperature was held at each point for 30 minutes, 60 minutes and 25 minutes. The resulting catalyst's particle size and SPAN are 16.3 micron and 1.1, respectively and the resultant catalyst is regular in shape.

Preparation of the inventive catalyst (E)

Example A is repeated keeping the increase in reaction temperature to 20° C., 60° C., 90° C. such that the temperature was held at each point for 30 minutes, 60 minutes and 25 minutes. The resulting catalyst's particle size and SPAN are 28.6 micron and 1.3, respectively and the resultant catalyst is regular in shape.

Preparation of the inventive catalyst (F)

Example A is repeated except that TiCl$_4$ amount is changed to 75 ml. The resulting catalyst's particle size and SPAN are 12.8 micron and 1.0, respectively and the resultant catalyst is regular in shape.

Preparation of the inventive catalyst (G)

Example A is repeated except that resulting solid catalyst was separated from reaction mixture by filtration. The resulting catalyst's particle size and SPAN are 8.2 micron and 0.8, respectively and the resultant catalyst is regular in shape.

Preparation of the comparative catalyst (CA1)

Example A is repeated except that temperature was directly increased from 20° C. to 100° C. in 60 minutes. The resulting catalyst's particle size and SPAN are 46.3 micron and 1.6, respectively and the resultant catalyst is irregular in shape.

Preparation of the comparative catalyst (CA2)

Example A is repeated except that alcohol used in preparation of magnesium complex is ethanol. The resulting catalyst's particle size and SPAN are 36.5 micron and 1.4, respectively and the resultant catalyst is irregular in shape.

Preparation of the Comparative Catalyst (CB)

Example B is repeated except that temperature was directly increased from 20° C. to 100° C. in 40 minutes. The resulting catalyst's particle size and SPAN are 38.2 micron and 1.5, respectively and the resultant catalyst is irregular in shape.

Preparation of the Comparative Catalyst (CC)

Example C is repeated but the reaction temperature was directly increased from 15° C. to in 60 minutes. The resulting catalyst's particle size and SPAN are 42.9 micron and 1.6, respectively and the resultant catalyst is irregular in shape.

Preparation of the Comparative Catalyst (CD)

Example D is repeated but the reaction temperature was directly increased to 20° C. to 70° C. in 115 minutes. The resulting catalyst's particle size and SPAN are 76.8 micron and 1.9, respectively and the resultant catalyst is irregular in shape.

Preparation of the Comparative Catalyst (CE)

Example E is repeated but the reaction temperature was directly increased to 20° C. to 90° C. in 115 minutes. The resulting catalyst's particle size and SPAN are 62.6 micron and 1.7, respectively and the resultant catalyst is irregular in shape.

Polymerization Process

Polymerization of ethylene was carried out in 500 ml Buchi pressure reactor which was previously conditioned under nitrogen atmosphere. The reactor was charged with 350 ml of dry hexane containing solution of 10 wt. % triethylaluminum and calculated amount of solid catalyst. The reactor was pressurized with hydrogen to 0.9 bar then charged with ethylene under stirring at 750 revolutions per minute (rpm) to reach 5 bar. The reactor was heated and then held at 80° C. for 1 hour. At the end, the ethylene feed was stopped, the reactor was cooled, and the polymer was recovered at ambient conditions from hexane and dried under vacuum.

TABLE 1

Ethylene polymerization conditions and polymer properties

| CATALYST | | POLYMERIZATION | | | POLYMER ANALYSIS | | | |
|---|---|---|---|---|---|---|---|---|
| Cat. No. | Cat. Wt. (mg) | Al/Ti ratio | $H_2$ bar | Activity kg PE/g cat | MFI @5 kg dg/min | FRR $I_{21.6}/I_{5.0}$ | Fines (<106 μm) wt. % | Bulk density g/cc |
| A | 24.1 | 80 | 0.9 | 3.2 | 3.7 | 10.6 | 4.5 | 0.40 |
| B | 24.1 | 80 | 0.9 | 4.0 | 4.5 | 12.6 | 4.8 | 0.40 |
| C | 24.2 | 80 | 0.9 | 3.5 | 3.5 | 10.5 | 5.4 | 0.41 |
| D | 24.1 | 80 | 0.9 | 3.4 | 4.0 | 10.5 | 5.3 | 0.41 |
| E | 24.1 | 80 | 0.9 | 3.4 | 4.2 | 10.8 | 3.6 | 0.40 |
| F | 24.2 | 80 | 0.9 | 3.6 | 3.0 | 10.1 | 4.5 | 0.41 |
| G | 24.0 | 80 | 0.9 | 3.5 | 3.8 | 10.4 | 3.5 | 0.40 |
| CA1 | 24.0 | 80 | 0.9 | 1.8 | 5.4 | 10.0 | 14.2 | 0.28 |
| CA2 | 24.0 | 80 | 0.9 | 2.1 | 7.2 | 9.6 | 5.4 | 0.30 |
| CB | 24.1 | 80 | 0.9 | 1.9 | 8.1 | 9.5 | 12.9 | 0.24 |
| CC | 24.1 | 80 | 0.9 | 2.1 | 7.6 | 9.4 | 13.6 | 0.25 |
| CD | 24.0 | 80 | 0.9 | 2.0 | 8.0 | 9.7 | 14.7 | 0.21 |
| CE | 24.2 | 80 | 0.9 | 2.3 | 7.5 | 9.4 | 14.8 | 0.22 |

All the catalysts prepared using the process (Catalysts A to G) as described in the present invention shows activity >3 Kg PE/g cat with bulk density >0.4 g/cc. The polymer had fines content less than 10 wt. %.

TABLE 2

Hydrogen Response Studies

| CATALYST | | POLYMERIZATION | | | POLYMER ANALYSIS | | | |
|---|---|---|---|---|---|---|---|---|
| Cat. No. | Cat. Wt. (mg) | Al/Ti Ratio | $H_2$ bar | Activity Kg PE/g cat | MFI @5 kg dg/min | FRR $I_{21.6}/I_{5.0}$ | Fines (<106 μm) wt. % | Bulk density g/cc |
| A | 24.1 | 80 | 0.5 | 3.9 | 1.1 | 11.0 | 4.5 | 0.40 |
|   | 24.0 | 80 | 0.7 | 3.6 | 3.4 | 10.9 | 3.3 | 0.41 |
|   | 24.1 | 80 | 0.9 | 3.2 | 6.5 | 11.0 | 4.6 | 0.40 |
|   | 24.2 | 80 | 1.25 | 3.1 | 18.2 | 10.8 | 6.5 | 0.41 |
|   | 24.0 | 80 | 1.75 | 3.0 | 24.6 | ND | 4.0 | 0.40 |

One of the catalyst prepared using the process as described in the present invention shows excellent hydrogen response as the activity of the catalyst decreases with increasing hydrogen concentration. Despite having high concentrations of hydrogen, the catalyst showed activity >3 kg PE/g cat and fines in resultant polymer were >10 wt.%.

The said catalyst of the present invention was evaluated for copolymerization of ethylene with 1-hexene. Table 3 describes the polymerization conditions and the polymer analysis data. The trend of the addition of the monomer was 1-hexene followed by hydrogen and then ethylene. The hydrogen was kept at 0.9 bar. The catalyst showed activity >3 Kg PE/g cat with bulk density >0.4 g/cc. The polymer had fines content less than 5 wt. %.

TABLE 3

Co-Monomer Response Studies

| CATALYST | | POLYMERIZATION | | | POLYMER ANALYSIS | | | |
| --- | --- | --- | --- | --- | --- | --- | --- | --- |
| Cat. No. | Cat. Wt. (mg) | Al/Ti Ratio | 1-hexene ml | Activity Kg PE/g cat | MFI @5 kg dg/min | FRR $I_{21.6}/I_{5.0}$ | Fines (<106 μm) wt. % | Bulk density g/cc | Bulk SCB/1000C |
| A | 24.1 | 80 | 0.6 | 3.3 | 3.5 | 10.6 | 4.9 | 0.41 | 2.4 |
|   | 24.0 | 80 | 1.1 | 3.6 | 3.8 | 10.6 | 4.5 | 0.40 | 2.5 |

The said catalyst of the present invention was evaluated for hydrogen response during the copolymerization of ethylene with 1-hexene. Table 4 describes the polymerization conditions and the polymer analysis data. The trend of the addition of the monomer was 1-hexene followed by hydrogen and then ethylene. The 1-hexene was kept as 1.1 ml.

TABLE 4

Co-Monomer-hydrogen Response

| CATALYST | | POLYMERIZATION | | | POLYMER ANALYSIS | | | |
| --- | --- | --- | --- | --- | --- | --- | --- | --- |
| Cat. No. | Cat. Wt. (mg) | Al/Ti Ratio | $H_2$ bar | Activity Kg PE/g cat | MFI @5 kg dg/min | FRR $I_{21.6}/I_{5.0}$ | Fines (<106 μm) wt. % | Bulk density g/cc | Bulk SCB/1000C |
| A | 24.1 | 80 | 0.5 | 3.1 | 1.1 | 10.7 | 4.5 | 0.40 | 2.2 |
|   | 24.0 | 80 | 0.7 | 3.1 | 3.4 | 11.3 | 3.3 | 0.41 | 2.3 |
|   | 24.2 | 80 | 0.9 | 3.6 | 3.8 | 10.6 | 4.5 | 0.40 | 2.5 |
|   | 24.1 | 80 | 1.25 | 3.0 | 18.2 | 10.9 | 6.5 | 0.41 | 2.8 |
|   | 24.1 | 80 | 1.75 | 3.1 | 24.6 | ND | 3.8 | 0.40 | 2.9 |

The catalyst showed activity >3 Kg PE/g cat with bulk density >0.4 g/cc. The polymer had fines content less than 7 wt. %.

We claim:

1. A process for preparation of a catalyst for polymerization of olefins, the process comprising:
   (a) contacting a liquid magnesium complex, an electron donor compound and a titanium halide compound to form a solution at a temperature ranging from 0-25° C. for 1-10 hours;
   (b) precipitating the solution to obtain catalyst particles by
      (i) providing a first temperature ramp of 0.1-10° C./minute at a temperature ranging from 5-25° C.
      (ii) holding for at least 15 minutes;
      (iii) providing a second temperature ramp of 0.1-10° C./minute at a temperature ranging from 25-45° C.;
      (iv) holding for at least 30 minutes;
      (v) providing a third temperature ramp of 0.1-10° C./minute at a temperature ranging from 45-110° C.; and
      (vi) holding for at least 15 minutes at a temperature of 75° C.; and
   (c) washing the catalyst particles with an inert solvent to obtain a solid uniform catalyst.

2. The process as claimed in claim 1, wherein the electron donor compound is selected from the group consisting of alcohols, carboxylic acids, aldehydes, amines, ethers, and esters.

3. The process as claimed in claim 1, wherein the titanium halide compound is selected from the group consisting of titanium tetrahalides, alkoxytitanium trihalide, dialkoxy titanium dihalides and trialkoxytitanium monohalide.

4. The process as claimed in claim 1, wherein the inert solvent is selected from the group consisting of toluene, isopentane, isooctane, hexane, heptane, pentane and isohexane.

5. The process as claimed in claim 1, wherein a particle size of the catalyst ranges from 5-30 micron.

6. The process as claimed in claim 1, wherein activity of the catalyst ranges from 3-4 kg (co)polymer per g of the catalyst.

7. A process for polymerization of olefins, the process comprising:
   preparing a catalyst and
   contacting the catalyst and a co-catalyst with an olefin in presence of an inert hydrocarbon medium at a temperature ranging from 10-200° C., wherein preparing the catalyst comprises:
   (a) contacting a liquid magnesium complex, an electron donor compound and a titanium halide compound to form a solution at a temperature ranging from 0-25° C. for 1-10 hours;
   (b) precipitating the solution to obtain catalyst particles by
      (i) providing a first temperature ramp of 0.1-10° C./minute at a temperature ranging from 5-25° C.
      (ii) holding for at least 15 minutes;
      (iii) providing a second temperature ramp of 0.1-10° C./minute at a temperature ranging from 25-45° C.;
      (iv) holding for at least 30 minutes;
      (v) providing a third temperature ramp of 0.1-10° C./minute at a temperature ranging from 45-110° C; and
      (vi) holding for at least 15 minutes at a temperature of 75° C.; and
   (c) washing the catalyst particles with an inert solvent to obtain a solid uniform catalyst.

8. The process as claimed in claim 7, wherein the co-catalyst comprises an organoaluminium compound; and wherein the inert hydrocarbon medium is selected from the group consisting of aliphatic hydrocarbons, alicyclic hydrocarbons, and aromatic hydrocarbons.

9. The process as claimed in claim 7, wherein during polymerization of olefins the catalyst generates fines in a range of 3-10 wt. %.

\* \* \* \* \*